United States Patent
Chu et al.

(10) Patent No.: US 10,523,610 B2
(45) Date of Patent: *Dec. 31, 2019

(54) ONLINE ACTIVE LEARNING IN USER-GENERATED CONTENT STREAMS

(71) Applicant: Oath Inc., New York, NY (US)

(72) Inventors: Wei Chu, Redmond, WA (US); Martin Zinkevich, Santa Clara, CA (US); Lihong Li, Santa Clara, CA (US); Achint Oommen Thomas, Buffalo, NY (US); Belle Tseng, Cupertino, CA (US)

(73) Assignee: Oath Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/973,130

(22) Filed: May 7, 2018

(65) Prior Publication Data
US 2018/0255012 A1    Sep. 6, 2018

Related U.S. Application Data

(63) Continuation of application No. 13/282,285, filed on Oct. 26, 2011, now Pat. No. 9,967,218.

(51) Int. Cl.
*H04L 12/58* (2006.01)
*G06N 5/02* (2006.01)
(Continued)

(52) U.S. Cl.
CPC .......... *H04L 51/12* (2013.01); *G06F 11/00* (2013.01); *G06F 15/16* (2013.01); *G06N 5/02* (2013.01);
(Continued)

(58) Field of Classification Search
CPC ......... H04L 51/12; H04L 12/58; G06Q 50/20; Y04S 10/54; G06N 7/00; G06N 5/02; G06N 7/005; G06F 15/16; G06F 11/00
(Continued)

(56) References Cited

U.S. PATENT DOCUMENTS

| 5,486,686 A * | 1/1996 | Zdybel, Jr. ............ G06Q 10/10 235/375 |
| 2008/0103996 A1 * | 5/2008 | Forman .................. G06N 20/00 706/12 |

(Continued)

OTHER PUBLICATIONS

Markov chains and Monte carlo simulation, Book publisher by SpringerLink vol. 30, 2007 (Year: 2007).*

*Primary Examiner* — Tonia L Dollinger
*Assistant Examiner* — Mehulkumar J Shah
(74) *Attorney, Agent, or Firm* — Cooper Legal Group, LLC

(57) ABSTRACT

Software for online active learning receives content posted to an online stream at a website. The software converts the content into an elemental representation and inputs the elemental representation into a probit model to obtain a predictive probability that the content is abusive. The software also calculates an importance weight based on the elemental representation. And the software updates the probit model using the content, the importance weight, and an acquired label if a condition is met. The condition depends on an instrumental distribution. The software removes the content from the online stream if a condition is met. The condition depends on the predictive probability, if an acquired label is unavailable.

17 Claims, 8 Drawing Sheets

(51) Int. Cl.
  *G06F 11/00* (2006.01)
  *G06Q 50/20* (2012.01)
  *G06N 7/00* (2006.01)
  *G06F 15/16* (2006.01)

(52) U.S. Cl.
  CPC ............... *G06N 7/00* (2013.01); *G06N 7/005* (2013.01); *G06Q 50/20* (2013.01)

(58) Field of Classification Search
  USPC ............ 709/224; 370/252; 714/39; 340/16.1
  See application file for complete search history.

(56) References Cited

U.S. PATENT DOCUMENTS

| | | | |
|---|---|---|---|
| 2009/0089285 A1* | 4/2009 | Donato | H04L 51/12 |
| 2009/0265341 A1* | 10/2009 | Nordahl | G06F 16/2457 |
| 2010/0205123 A1* | 8/2010 | Sculley | G06F 21/562 |
| | | | 706/12 |
| 2011/0282695 A1* | 11/2011 | Blue | G06F 19/328 |
| | | | 705/4 |
| 2012/0054642 A1* | 3/2012 | Balsiger | G06Q 10/10 |
| | | | 715/752 |
| 2012/0158739 A1* | 6/2012 | Ah-Pine | G06F 17/18 |
| | | | 707/748 |
| 2012/0296634 A1* | 11/2012 | Revesz | H04L 51/12 |
| | | | 704/9 |

* cited by examiner

401 $p(\mathbf{w}_t) = N(\mathbf{w}; \mu_t, \Sigma_t)$

402 $\mathcal{P}(y_i|\mathbf{x}_i, \mathbf{w}, \beta_i) = \mathcal{P}^{\beta_i}(y_i|\mathbf{x}_i, \mathbf{w})$ 403 $\int \mathcal{P}^{\beta_i}(y_i|\mathbf{x}_i, \mathbf{w}) N^{\gamma}(\mathbf{w}; \mu_t, \Sigma_t)$ 404 $\check{\Sigma}_{t+1} = \Sigma_{t+1}(\beta_i \Sigma_t + (1-\beta_i)\Sigma_{t+1})^{-1}\Sigma_t$ 405 $\check{\mu}_{t+1} = \check{\Sigma}_{t+1}(\beta_i \Sigma_{t+1}^{-1}\mu_{t+1} + (1-\beta_i)\Sigma_t^{-1}\mu_t)$ 406 $\beta_i = \frac{1}{q(\mathbf{x}_i)}$

Figure 4

$$\breve{p}(y|\mathbf{x};\theta) = \epsilon + (1-2\epsilon)p(y|\mathbf{x};\theta)$$

501

$$q(\mathbf{x}) = \sum_y -\breve{p}(y|\mathbf{x};\theta)\log_2(\breve{p}(y|\mathbf{x};\theta))$$

502

ONLINE ACTIVE LEARNING IN USER-GENERATED CONTENT STREAMS

CLAIM OF PRIORITY

This application is a Continuation Application of U.S. application Ser. No. 13/282,285, filed on Oct. 26, 2011, and entitled "Online Active Learning In User-Generated Content Streams," which is incorporated herein by reference in its entirety.

BACKGROUND

A stream of user-generated content (UGC) is a common occurrence on Internet websites. For example, on a website hosting an online publication, such a stream might take the form of comments on an online article. Or such a stream might take the form of a news feed based on a social graph on a website hosting a social network or social media.

For both legal and business reasons, hosting websites monitor such streams for abusive content. Such abusive content might take the form of spam, fraudulent or illegal offers, offensive language, threatening language, or treasonous language, if the UGC is text or audio. Similarly, such abusive content might take the form of pornography or violent imagery, if the UGC is an image or video.

Alternatively, websites might monitor such streams for interesting (e.g., buzzworthy) content and relocate such content in the stream so as to engage users. For example, Facebook uses an algorithm called EdgeRank to construct a News Feed that is personalized in terms of interestingness, among other things, for each user profile and/or user history. In this regard, also see the "interestingness" algorithm described in co-owned U.S. Published Patent Application No. 2006/0242139, entitled "Interestingness Ranking of Media Objects".

Monitoring a stream for abusive UGC is difficult because the posters of such content are adversarial and learn how to avoid hard-and-fast rules. In the area of predictive analytics and machine learning, this problem falls under the category of concept drift, e.g., changes over time in the concept being modeled by a classification system. It will be appreciated that interesting content is almost inherently subject to concept drift.

Online active learning addresses the problem of concept drift, e.g., by adjusting the predictive model (or classifier) according to new UGC with the aid of human labelers. However, human labelers are expensive both in terms of time and money. So research is ongoing on efforts to lessen the involvement of human editors in predictive models that perform online active learning.

SUMMARY

In an example embodiment, a processor-executed method is described for displaying suggested queries for monitoring UGC. According to the method, software for online active learning receives content posted to an online stream at a website. The software converts the content into an elemental representation and inputs the elemental representation into a probit model to obtain a predictive probability that the content is abusive. The software also calculates an importance weight based on the elemental representation. And the software updates the probit model using the elemental representation, the importance weight, and an acquired label. The update occurs if a condition is met and the condition depends on an instrumental distribution. The software removes the content from the online stream, based on the predictive probability, if an acquired label is unavailable.

In another example embodiment, an apparatus is described, namely, a computer-readable storage medium which persistently stores a program for monitoring UGC. The program might be a module in software for online active learning. The program receives content posted to an online stream at a website. The program converts the content into an elemental representation and inputs the elemental representation into a probit model to obtain a predictive probability that the content is abusive. The program also calculates an importance weight based on the elemental representation. And the program updates the probit model using the elemental representation, the importance weight, and an acquired label. The update occurs if a condition is met and the condition depends on an instrumental distribution. The program removes the content from the online stream, based on the predictive probability, if an acquired label is unavailable.

Another example embodiment involves a processor-executed method for displaying user generated content. According to the method, software for online active learning receives content posted to an online stream at a website. The software converts the content into an elemental representation and inputs the elemental representation into a probit model to obtain a predictive probability that the content is interesting. The software also calculates an importance weight based on the elemental representation. And the software updates the probit model using the elemental representation, the importance weight, and an acquired label. The update occurs if a condition is met and the condition depends on an instrumental distribution. The software relocates the content in the online stream, based on the predictive probability, if an acquired label is unavailable.

Other aspects and advantages of the inventions will become apparent from the following detailed description, taken in conjunction with the accompanying drawings, which illustrate by way of example the principles of the inventions.

BRIEF DESCRIPTION OF THE DRAWINGS

FIG. 4 shows formulas relating to probit models, in accordance with an example embodiment.

DETAILED DESCRIPTION

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

Figure 1:
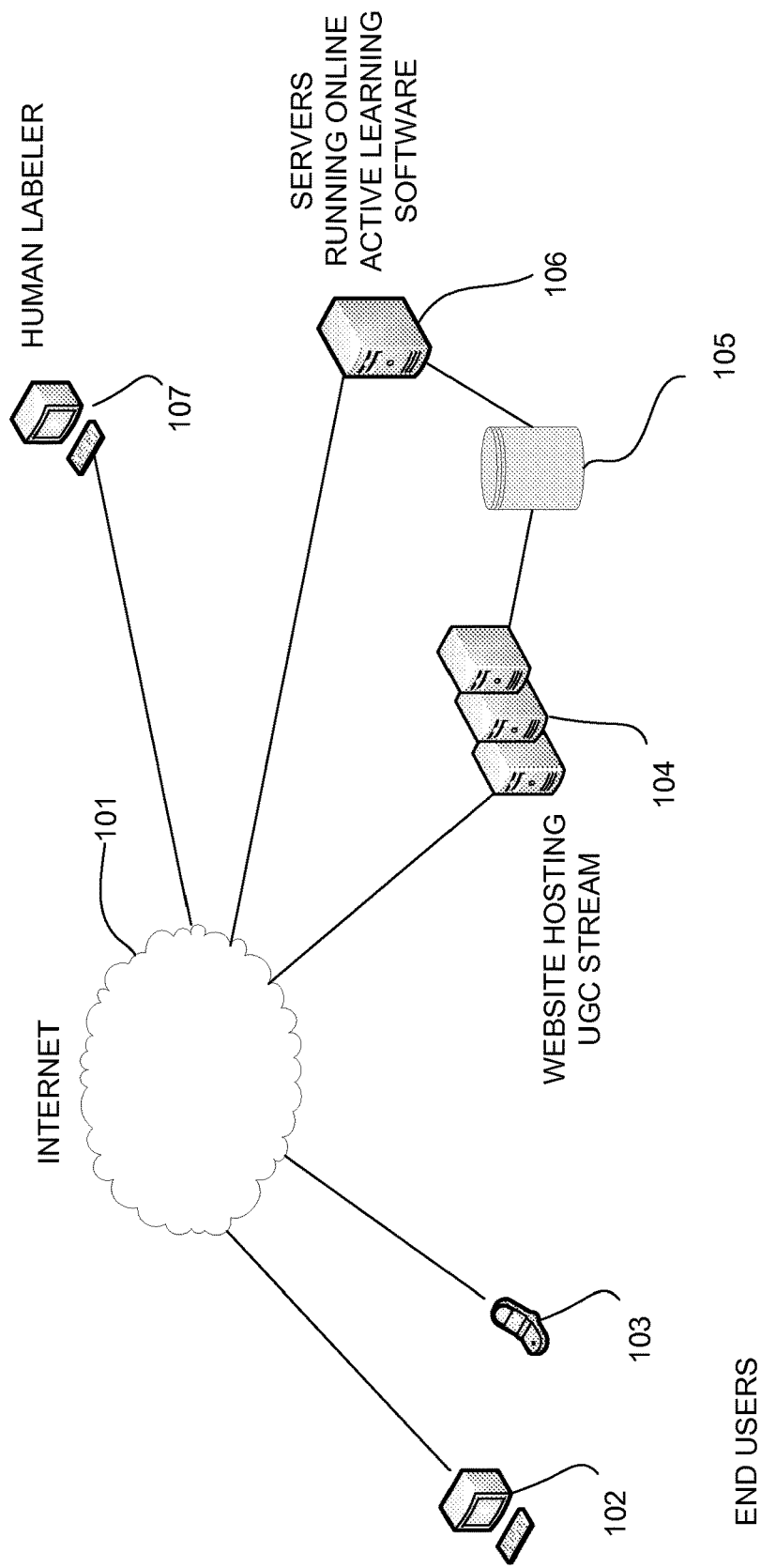
FIG. 1 is a simplified network diagram that illustrates a website hosting a UGC stream, in accordance with an example embodiment.

FIG. 1 is a simplified network diagram that illustrates a website hosting a UGC stream, in accordance with an example embodiment. As depicted in this figure, a personal computer 102 (e.g., a laptop or other mobile computer) and a mobile device 103 (e.g., a smartphone such as an iPhone, Android, Blackberry, etc.) are connected by a network 101 (e.g., a wide area network (WAN) including the Internet, which might be wireless in part or in whole) with a website 104 hosting a UGC stream (e.g., an online publication or a social networking/media website). In an example embodiment, personal computer 102 and mobile device 103 might be used by end users who post UGC content to the UGC stream at website 104.

In an example embodiment, the website 104 is composed of a number of servers connected by a network (e.g., a local area network (LAN) or a WAN) to each other in a cluster or other distributed system which might run website software (e.g., web server software, database software, etc.) and distributed-computing and/or cloud software such as Map-Reduce, Google File System, Hadoop, Pig, CloudBase, etc. The servers are also connected (e.g., by a storage area network (SAN)) to persistent storage 105. Persistent storage 105 might include a redundant array of independent disks (RAID). Persistent storage 105 might be used to store data related to the UGC content stream and the models described in greater detail below.

Also connected to persistent storage 105 are the servers in cluster 106, which might run online active learning software which modifies the UGC stream, e.g., in response to labels input by human labelers. In an example embodiment, servers in cluster 106 are also connected through network 101 with personal computer 107, which might be used by such a human labeler. In an alternative example embodiment, a human labeler might use a mobile device, such as mobile device 103. In an example embodiment, the servers in cluster 106 might also run the distributed-computing and/or cloud software described above.

In an alternative example embodiment, the servers in website 104 and in cluster 106 and the storage 105 might be hosted wholly or partially off-site in the cloud, e.g., as a platform-as-a-service (PaaS) or an infrastructure-as-a-service (IaaS).

Personal computers 102 and 107 and the servers in website 104 and cluster 106 might include (1) hardware consisting of one or more microprocessors (e.g., from the x86 family or the PowerPC family), volatile storage (e.g., RAM), and persistent storage (e.g., a hard disk or solid-state drive), and (2) an operating system (e.g., Windows, Mac OS, Linux, Windows Server, Mac OS Server, etc.) that runs on the hardware. Similarly, in an example embodiment, mobile device 103 might include (1) hardware consisting of one or more microprocessors (e.g., from the ARM family), volatile storage (e.g., RAM), and persistent storage (e.g., flash memory such as microSD) and (2) an operating system (e.g., Symbian OS, RIM BlackBerry OS, iPhone OS, Palm webOS, Windows Mobile, Android, Linux, etc.) that runs on the hardware.

Also in an example embodiment, personal computers 102 and 107 and mobile device 103 might each include a browser as an application program or as part of an operating system. Examples of browsers that might execute on personal computers 102 and 107 include Internet Explorer, Mozilla Firefox, Safari, and Google Chrome. Examples of browsers that might execute on mobile device 103 include Safari, Mozilla Firefox, Android Browser, and Palm webOS Browser. It will be appreciated that users of personal computer 102 and mobile device 103 might use browsers to communicate (e.g., through a graphical user interface or GUI) with website software running on the servers at website 104. Examples of website 104 include a website such as Yahoo! News, Flickr, Facebook, and Google+, among others. Likewise, a human labeler using personal computer 107 might use a browser to communicate (e.g., through a GUI) with the online active learning software running on the servers at cluster 106.

Figure 2:
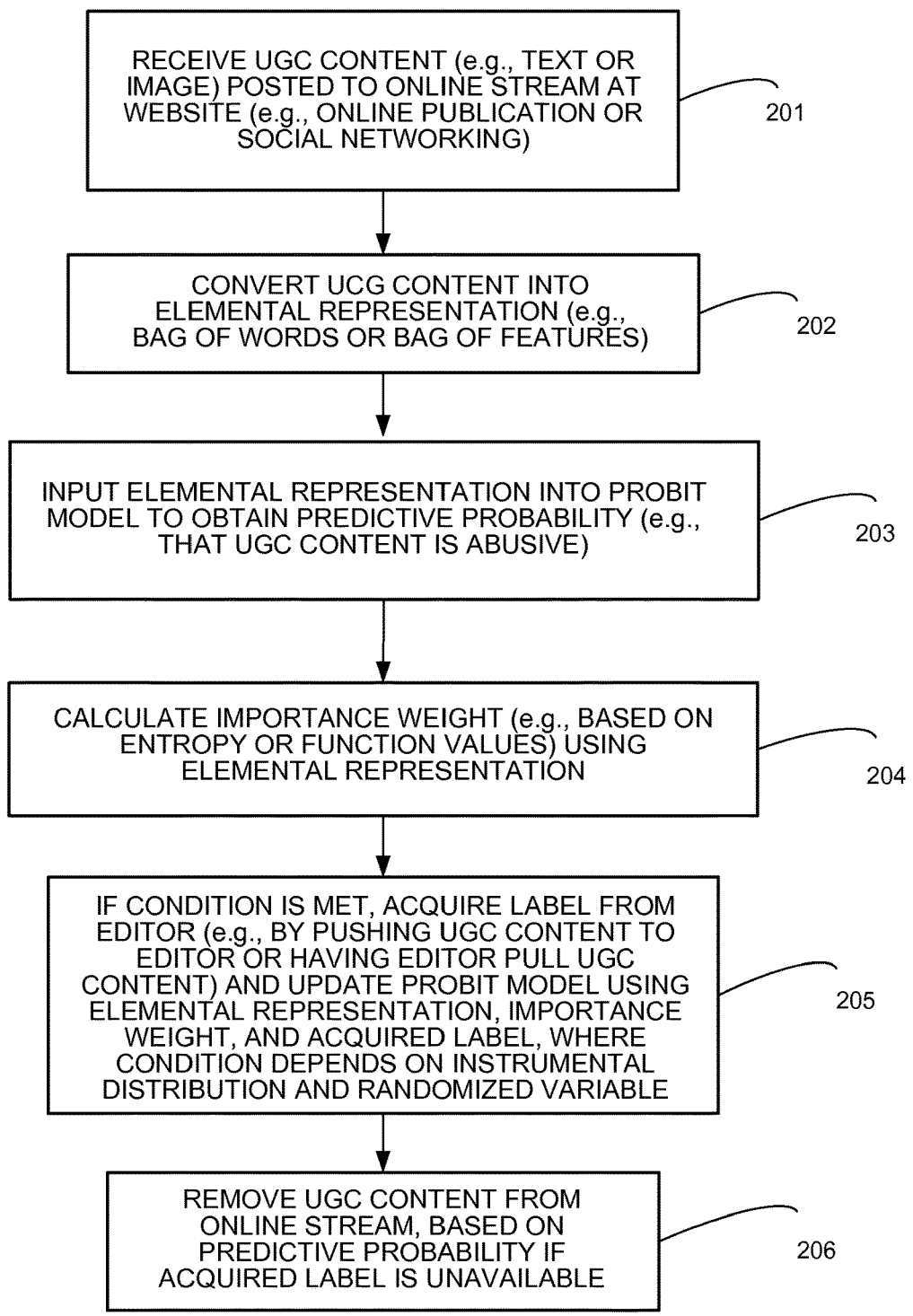
FIG. 2 is a flowchart diagram that illustrates a process for removing abusive content from a UGC stream, in accordance with an example embodiment.

FIG. 2 is a flowchart diagram that illustrates a process for removing abusive content from a UGC stream, in accordance with an example embodiment. In an example embodiment, this process might be performed by the online active learning software running on server cluster 106 with access to data for a UGC stream that is stored on storage 105 and an editor (a human labeler) on personal computer 107. As depicted in FIG. 2, the software receives UGC content (e.g., text or an image) posted to an online stream at a website, in operation 201. For example, the online stream might be comments associated with an article in an online publication. Or the online stream might be a news feed associated with a profile on a social network. In operation 202, the software converts the UGC content into an elemental representation. For example, if the UGC content is text, the elemental representation might be a vector (e.g., normalized to a size of 1 using a factor such as 1/(square root of the number of unique words)) generated using a "bag of words" model, where the words are uni-grams, bi-grams, n-grams, skip-grams, etc., and each unique word is given its own dimension. Alternatively, if the UGC content is text, the elemental representation might be a vector generated using tf-idf (term frequency-inverse document frequency). If the UGC content is an image, the elemental representation might be a vector generated using a "bag of features" model, a SIFT (Scale Invariant Feature Transform), or a color histogram.

Then in operation 203, the software inputs the elemental representation into a probit model to obtain a predictive probability. A probit model is described in Bliss, *The calculation of the dosage-mortality curve*, Annals of Applied Biology, 22:134-167 (1935). In an example embodiment, the software uses an online update variant (e.g., online Bayesian variant) of the probit model that can handle weighting through an approximation technique, as described by Minka, *A family of algorithms for approximate Bayesian inference*, Ph.D. thesis, Massachusetts Institute of Technology (January 2001). If the software is monitoring UGC content for abuse, the probit model might be a binary classifier and the predictive probability might be a probability that the UGC content is commercial spam or not (e.g., represented by +1 and −1). However, in an alternative example embodiment, the probit model might be an ordinal classifier or ranker (with rankings of 1, 2, 3, 4, and 5, for example), rather than a binary classifier, and the predictive probability might relate to an ordinal value rather than binary value.

In operation 204, the software calculates an importance weight using the elemental representation. Importance weights are described in Beygelzimer et al., *Importance weighted active learning*, in Proceedings of the Twenty-Sixth International Conference on Machine Learning (ICML-09), pages 49-56 (2009). In an example embodiment, the importance weight might be based on entropy (or information entropy), as described in Lewis et al., *A sequen-

*tial algorithm for training text classifiers*, in Proceedings of the Seventeenth Annual International ACM-SIGIR Conference on Research and Development in Information Retrieval (SIGIR-94), pages 3-12 (1994). In an alternative example embodiment, the importance weight might be based on function values, as described by Cesa-Bianchi et al., *Worst-case analysis of selective sampling for linear classification*, Journal of Machine Learning Research, 7:1205-1230 (2006).

In operation 205, the software acquires a label from an editor (e.g., by pushing UGC content to the editor or having the editor pull UGC content) and updates the probit model with the UGC content, the importance weight, and the acquired label. The label is acquired and the update occurs if a condition is met. It will be appreciated that the label might indicate the editor's opinion as to whether the UGC content is abusive, in the context of this figure. In an example embodiment, the condition depends on an instrumental distribution and a randomized variable. To obtain a randomized variable, a floating-point number between 0 and 1 might be randomly selected (e.g., through a process that simulates the flipping of a biased coin) by the software. And if the selected floating-point number is less than a value from the instrumental distribution determined by the elemental representation, the condition is met. (Alternatively, the software might make a call to a library function such as rand( ) that provides a randomized variable.) Then in operation 206, the software removes the UGC content from the online stream, based on the predictive probability, if an acquired label is not available. It will be appreciated that an acquired label might not be available because the condition was not met. Or the condition might have been met, but a label has not yet been acquired due to time constraints (e.g., the software is configured to proceed, if a label is not received within a particular time period). In an example embodiment, a threshold might be applied to the predictive probability. In an alternative example embodiment, the predictive probability might become an input to an abuse-monitoring system that receives other inputs, e.g., a predictive probability from a classifier related to the poster rather than the UGC content or a predictive probability based on an abuse report.

As indicated above, the software might acquire the label from an editor (e.g., a human labeler) that pulls the UGC content. In an example embodiment, the editor might retrieve the UGC content from a probabilistic queue (or buffer) that depends upon the predictive probability obtained in operation 203. For example, the UGC content might be retrieved from the probabilistic queue based on the predictive probability. And/or, the UGC content might be inserted into the probabilistic queue based on the predictive probability. It will be appreciated that such a queue might help prevent loss of UGC content due to limitations on storage (e.g., volatile memory or persistent storage). It will further be appreciated that such an editor might be paid on a piecemeal basis, e.g., through Amazon's Mechanical Turk. In an alternative example embodiment, the software might push the UGC content (e.g., with a text or email message over a network) to the editor (e.g., an editor paid by the hour rather than piecemeal) without resort to a queue.

Further details of the process described in the flowchart in FIG. 2 can be found in the article by Chu et al., *Unbiased Online Active Learning in Data Streams*, KDD '11, San Diego, Calif. USA (Aug. 21-24, 2011), which article is hereby incorporated by reference.

Figure 3:
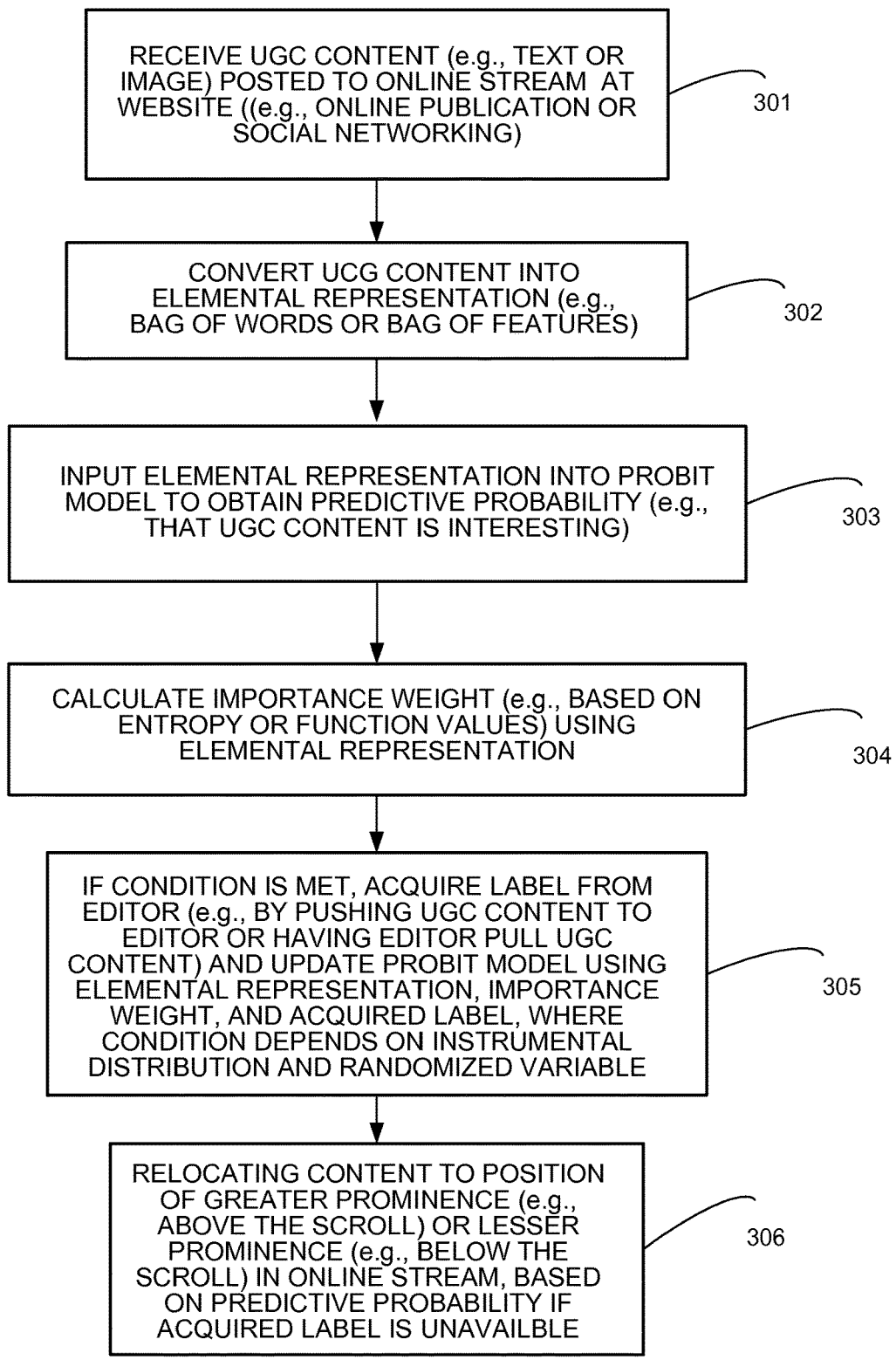
FIG. 3 is a flowchart diagram that illustrates a process for relocating interesting content in a UGC stream, in accordance with an example embodiment.

FIG. 3 is a flowchart diagram that illustrates a process for relocating interesting content in a UGC stream, in accordance with an example embodiment. Here again, in an example embodiment, this process might be performed by the online active learning software running on server cluster 106 with access to data for a UGC stream that is stored on storage 105 and the human editor on personal computer 107. As depicted in FIG. 3, the software receives UGC content (e.g., text or an image) posted to an online stream at a website, in operation 301. In operation 302, the software converts the UGC content into an elemental representation, e.g., a vector generated using a "bag of words" model or a "bag of features" model. Then in operation 303, the software inputs the elemental representation into a probit model to obtain a predictive probability, e.g., that the UGC content in interesting. Alternatively, the predictive probability might relate to an ordinal ranking with respect to interestingness (e.g., buzzworthiness) from an ordinal classifier or an ordinal ranker (with rankings of 1, 2, 3, 4, and 5, for example). Here again, the probit model might be an online update variant (e.g., online Bayesian variant) of the probit model that can handle weighting through an approximation technique.

In operation 304, the software calculates an importance weight using the elemental representation. In an example embodiment, the importance weight might be based on entropy (or information entropy). In an alternative example embodiment, the importance weight might be based on function values. And in operation 305, the software acquires a label from an editor (e.g., by pushing UGC content to the editor or having the editor pull UGC content) and updates the probit model with the UGC content, the importance weight, and the acquired label. The label is acquired and the update occurs if a condition is met. It will be appreciated that the label might indicate the editor's opinion as to whether the UGC content is interesting (e.g., buzzworthy) or be an ordinal ranking with respect to the interestingness (e.g., buzzworthiness) of the UGC content, in the context of this figure. In an example embodiment, the condition depends on an instrumental distribution and a randomized variable, as described above. To obtain a randomized variable, a floating-point number between 0 and 1 might be randomly selected (e.g., through a process that simulates the flipping of a biased coin) by the software. (Alternatively, the software might make a call to a library function such as rand( ) that provides a randomized variable.) And if the selected floating-point number is less than the value from the instrumental distribution determined by the elemental representation, the condition is met. Then in operation 306, the software relocates the UGC content to a position of greater prominence (e.g., towards the beginning of the online stream or "above the scroll") or lesser prominence (e.g., towards the end of the online stream or "below the scroll") in the online stream, based on the predictive probability or ordinal ranking, if an acquired label is unavailable. It will be appreciated that an acquired label might not be available because the condition was not met. Or the condition might have been met, but a label has not yet been acquired due to time constraints (e.g., the software is configured to proceed, if a label is not received within a particular time period). Here again, a threshold might be applied to the predictive probability or ordinal ranking to determine the position in the online stream, in an example embodiment. In an alternative example embodiment, the predictive probability or ordinal ranking might become an input to an algorithm (such as Facebook's EdgeRank) that is used to construct an online stream which is personalized to a user profile.

FIG. 4 shows formulas relating to probit models, in accordance with an example embodiment. These formulas pertain to linear models for binary classification in the context of online Bayesian learning. The vector w is the weight vector for such a linear model whose parameters (e.g., a mean and a covariance matrix) are θ (theta) at time t. The function value for the model is $x^T w$, where x is a column vector of features (e.g., words or image features) used for binary classification and T is the transpose operator. Formula 401 shows the distribution of $w_t$ modeled as a multivariate Gaussian distribution with mean $\mu_t$ (e.g., sample mean) and covariance matrix $\Sigma_t$ (e.g., sample covariance). Formula 402 shows a weighted probit (or likelihood) function P based on such a linear model, where $y_i$ is a label (e.g., y is an element of {+1, −1} for binary classification problems) and where $\beta_i$ is the importance weight. In an example embodiment, such a weighted probit function might be implemented by adding importance weighting to the implementation described in Newton et al., *Approximate Bayesian inference by the weighted likelihood bootstrap*, Technical Report No. 199, Department of Statistics, University of Washington (March 1991).

It will be appreciated that in a probit model based on formula 402, the variance of weights might converge towards zero as labeled samples increase and therefore the probit model would gradually stop learning. In order to address this problem, a memory loss factor might be incorporated into the probit model, for example, the prior distribution of w at time t. Formula 403 shows a weighted probit function that incorporates such a memory loss factor, e.g., $N^\gamma(w; \mu_{t+1}, \Sigma_{t+1})$. It will be appreciated formula 403 is a joint likelihood function and the loss factor γ is greater than or equal to zero and less than or equal to one.

It will be further appreciated that either formula 402 or formula 403 might be used as a probit model to obtain an predictive probability in step 203 of the process shown in FIG. 2 or in step 303 of the process shown in FIG. 3.

Formula 404 is an update rule for a covariance matrix $\Sigma_t$ and formula 405 is an update rule for a mean $\mu_t$, based on the Gaussian approximation (e.g., $N(w; \mu_{t+1}, \Sigma_{t+1})$) and the importance weight $\beta_i$. As shown in Formula 406, $\beta_i$ can be defined as $1/q(x_i)$, where $q(x_i)$ is an instrumental distribution, for importance weighting, which differs from the distribution for the Gaussian approximation. It will be appreciated that the update rules shown in formulas 404 and 405 might be used when updating the probit model in step 205 of the process shown in FIG. 2 or in step 305 of the process shown in FIG. 3.

In an alternative example embodiment, the probit model and the update rules might use a measure of central tendency other than a mean and a measure of dispersion other than a covariance matrix. For example, the measure of central tendency might be a median and the measure of dispersion might be a range such as the interquartile range.

Figure 5:
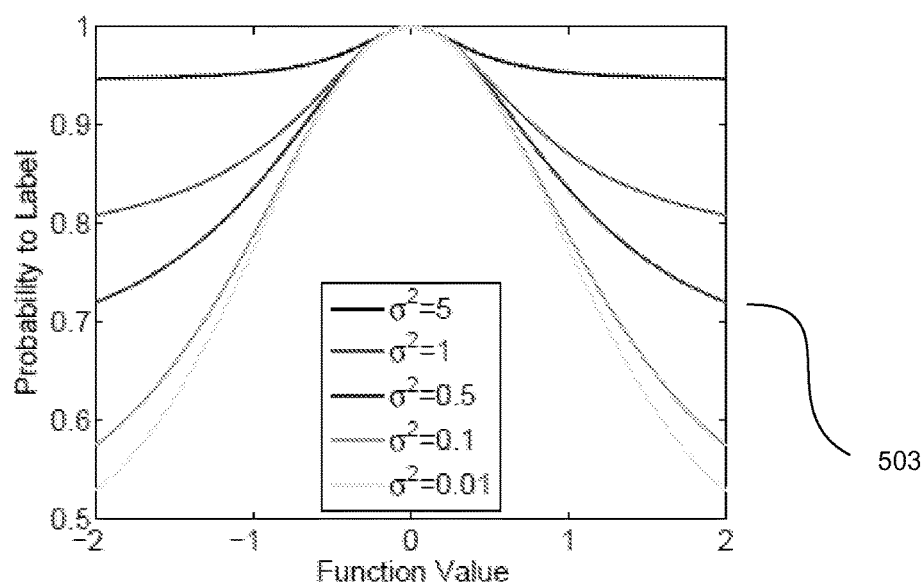
FIG. 5 shows formulas and a graph for an instrumental distribution based on entropy, in accordance with an example embodiment.

Formula 501 in FIG. 5 is a tolerance-adjusted predictive probability p(y|x; θ). In this formula, θ (theta) are the parameters, e.g., a mean and a covariance matrix, for a model (or classifier) and ϵ is a tolerance parameter (which can take on values greater than or equal to zero and less than 1) that reflects a misclassification rate. Formula 502 uses formula 501 and is a formula for an instrumental distribution for importance weighting q(x) based on entropy. It will be appreciated that the importance weight $\beta_i$ is the reciprocal of $q(x_i)$ as shown by formula 406, in an example embodiment. FIG. 5 also shows a graph 503 of example curves based on formula 502 for different values of $\sigma^2$, where (1) the independent variable is function value, which is equal to $x^T w$ for a fixed tolerance parameter ϵ (approximately equal to 0.1) and (2) the dependent variable is the probability of labeling. In an example embodiment, $\sigma^2$ might be equal to $x^T \Sigma x$.

Figure 6:
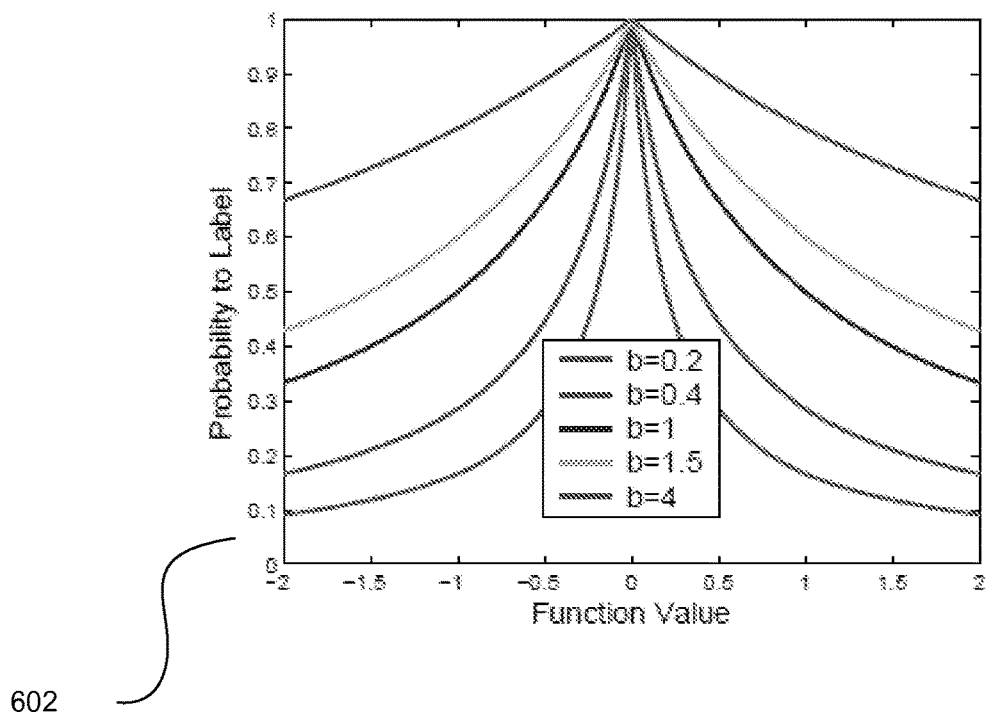
FIG. 6 shows a formula and a graph for an instrumental distribution based on function values, in accordance with an example embodiment.

Formula 601 in FIG. 6 shows a formula for an instrumental distribution for importance weighting q(x) based on function values as described in Cesa-Bianchi et al., *Worst-case analysis of selective sampling for linear classification*, Journal of Machine Learning Research, 7:1205-1230 (2006). Here again, it will be appreciated that the importance weight $\beta_i$ is the reciprocal of $q(x_i)$ as shown by formula 406, in an example embodiment. In an example embodiment, b is a parameter which might be thought of as a noise factor. FIG. 6 also shows a graph 602 of example curves based on formula 601 for different values of parameter b, where the independent variable is again functional value and the dependent variable is again probability of labeling. It will be appreciated that the example curves in graph 503 and the example curves in graph 602 are conceptually similar, with a difference being reflected in the capability of an implementation to modify the probability of labeling based on prediction uncertainty.

Figure 7:
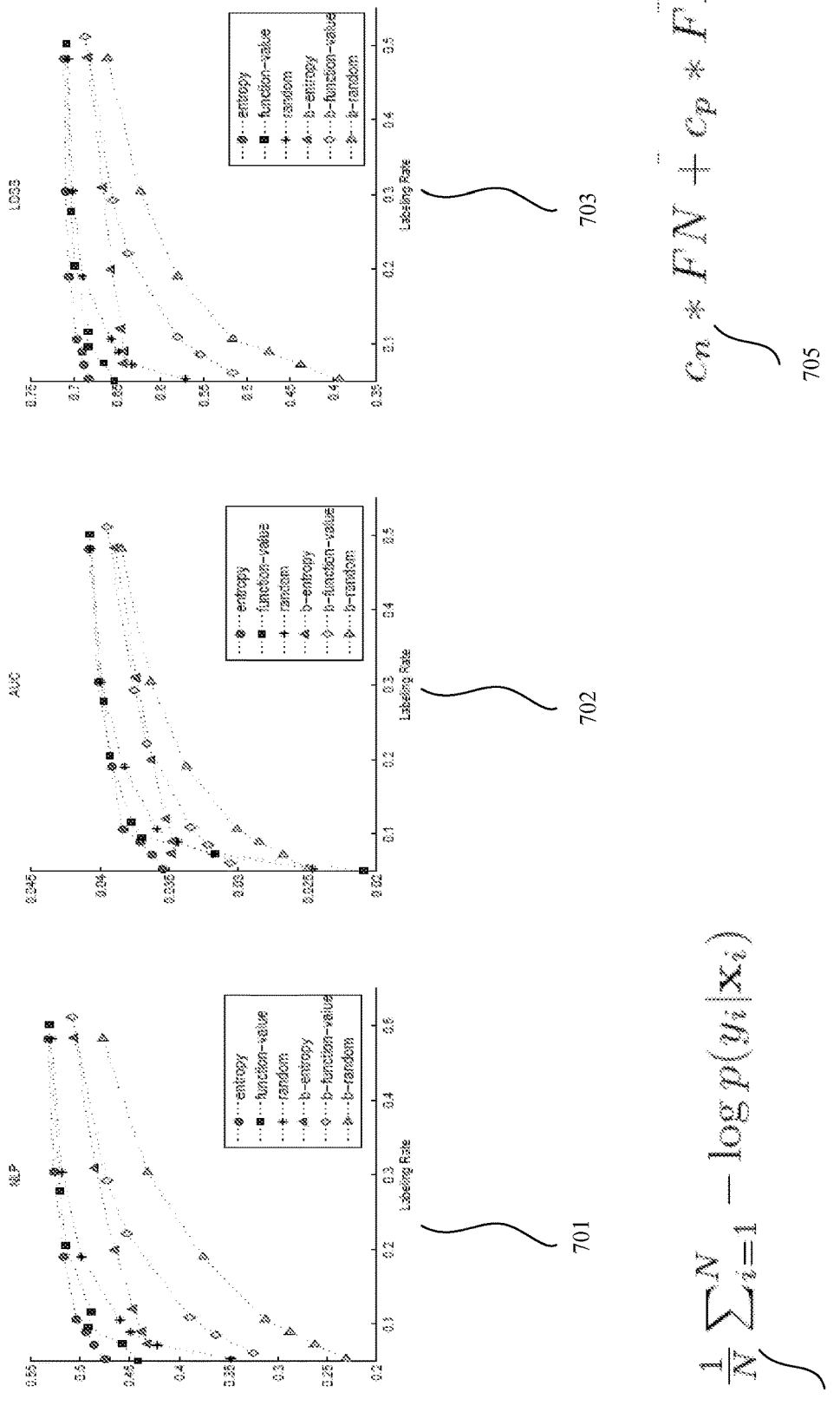
FIG. 7 shows graphs measuring the relative performance of biased and unbiased predictive models.

FIG. 7 shows graphs measuring the relative performance of biased and unbiased predictive models. The data for the performance comparisons were comments on news articles at a commercial news portal (e.g., Yahoo! News) which were classified by human editors as either abusive (e.g., commercial spam) or clean.

In graph 701, the performance metric is negative logarithm of predictive probability (NLP) which is defined by formula 702, where $p(y_i|x_i)$ is the predictive probability given by the model (or classifier). NLP is zero for a perfect classifier. In graph 702, the performance metric is Area Under ROC (AUC), where ROC is the receiving operating characteristic. AUC is a popular performance metric to measure the quality of predictive ordering on classification datasets. In the experiments reflected in graph 702, predictive ordering was determined by sorting the predictive probabilities ($p(y_i=+1|x_i)$) in descending order. AUC is 1 for perfect ordering and 0.5 for random guessing. In graph 703, the performance metric is Weighted Loss (WL), which is defined by formula 705, where $c_n$ and $c_p$ are prefixed cost scalars, FN is the number of false negative predictions, and FP is the number of false positive predictions. Based on Bayesian decision theory, the optimal threshold is $c_p/(c_p+c_n)$ rather than 0.5 in the cost-sensitive setting, e.g., the classifier yields a positive label if $(p(y_i=+1|x_i) \geq c_p/(c_p+c_n)$, otherwise the classifier yields a negative label. In the experiments reflected in graph 703, $c_n=9$ and $c_p=1$.

Each of the graphs in FIG. 7 show the performance results for six different models: (1) entropy, which is the probit model with importance weighting based on entropy, as shown in FIG. 5; (2) function-value, which is the probit model with importance weighting based on function values, e.g., as shown in FIG. 6; (3) random, where a fraction of samples are selected randomly for sampling at the same selection rate as in (1); (4) b-entropy, a biased probit model based on entropy (e.g., with a tolerance parameter ϵ), where selected samples are equally weighted rather than weighted by 1/q(x); (5) b-function-value, a biased probit model based on function values (e.g., with a parameter b), where selected samples are equally weighted rather than weighted by 1/q(x); and (6) b-random, a biased random model where a fraction of samples are selected randomly for sampling at the same selection rate as in (4). It will be appreciated that the labeling rate in the entropy-based algorithms (1) and (4) is controlled by the tolerance parameter ϵ. This parameter was varied from 0.1 to 0.0025, resulting in a labeling rate decrease from 50% to 5%. It will also be appreciated that the labeling rate in the function-value-based algorithms (2) and (5) is controlled by the parameter b. This parameter was varied from 4 to 0.2, also resulting in a labeling rate decrease from 50% to 5%.

In each of the graphs in FIG. 7, a larger metric implies better performance. As shown by those graphs, the three biased models (e.g., (4), (5), and (6)) tend to yield inferior performance relative to the unbiased models (e.g., (1), (2), and (3)). That is to say, the unbiased models tend to converge faster than the biased models. In terms of the unbiased models, the entropy-based and function-value-based models tend to perform better (e.g., converge faster) than the random model.

Figure 8:
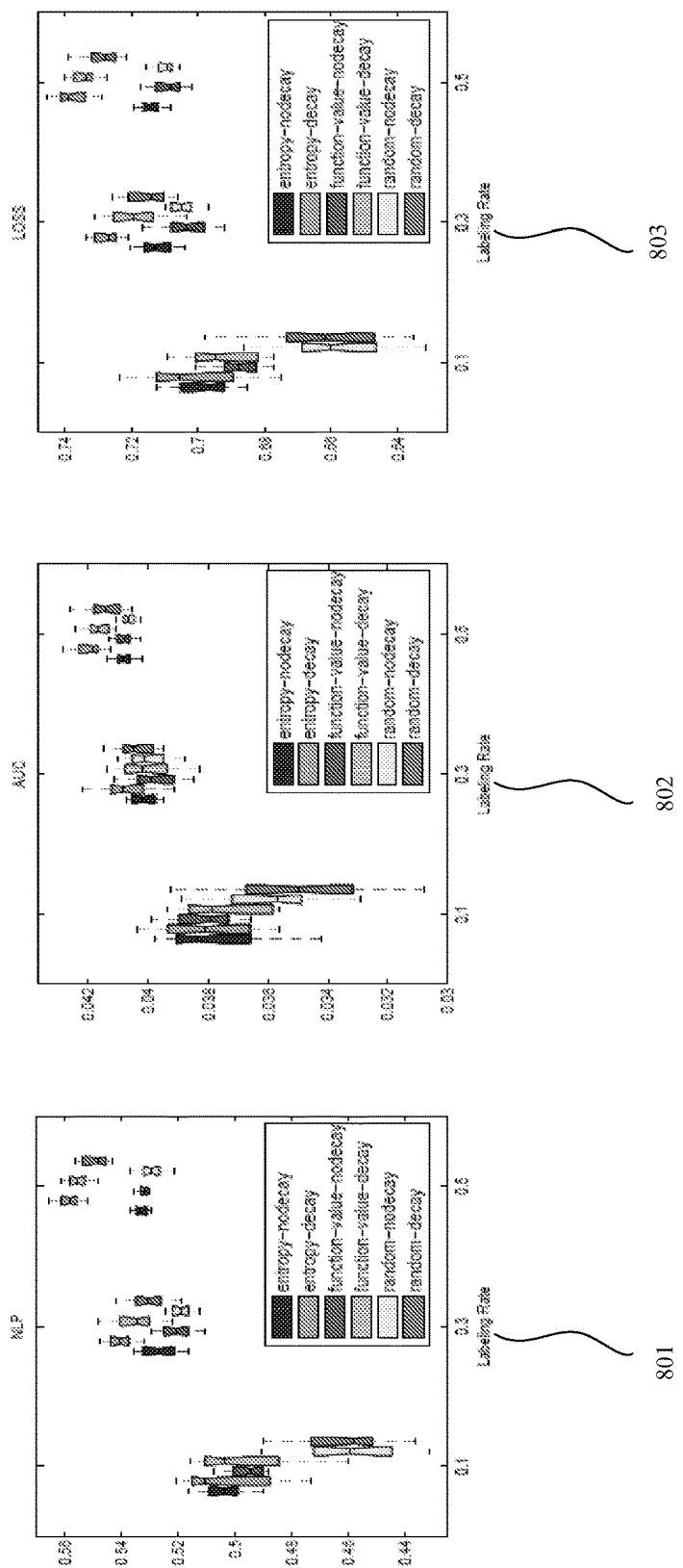
FIG. 8 shows graphs measuring the relative performance of predictive models with and without memory decay.

FIG. 8 shows the relative performance of predictive models with and without memory loss. In graph 801, the performance metric is NLP. In graph 802, the performance metric is AUC. And in graph 803, the performance metric is Weighted Loss (WL). Here again, a random model was used as a baseline and the data for the performance comparisons were comments on news articles at a commercial news portal (e.g., Yahoo! News) which were classified by human editors as either abusive (e.g., commercial spam) or clean.

Each of the graphs in FIG. 8 show the performance results for six different models: (1) entropy with no memory decay (e.g., with no memory loss factor as described earlier); (2) entropy with memory decay (e.g., with the memory loss factor); (3) function value with no memory decay (e.g., with no memory loss factor); (4) function value with memory decay (e.g., with the memory loss factor); (5) random (as described earlier) with no memory decay (e.g., with no memory loss factor); and (6) random with memory decay (e.g., with the memory loss factor). The memory decay factor was varied from 1.0 to 0.999.

In each of the graphs in FIG. 8, a larger metric implies better performance. As shown by those graphs, the three models without memory decay (e.g., (1), (3), and (5)) tend to yield inferior performance relative to the models with memory decay (e.g., (2), (4), and (6)), when the memory decay factor is 0.9999 or 0.99999. That is to say, the models with memory decay tend to converge faster than the models without memory decay. The best performance occurred when the memory decay factor was 0.9999. When the memory decay factor was lowered to 0.9995, the models without memory decay performed better than the models with memory decay.

With the above embodiments in mind, it should be understood that the inventions might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the inventions are useful machine operations. The inventions also relate to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The inventions can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although example embodiments of the inventions have been described in some detail for purposes of clarity of understanding, it will be apparent that certain changes and modifications can be practiced within the scope of the following claims. For example, the processes described above might be used with online active learning in a context unrelated to monitoring UGC. Or the processes described above might be used with progressive validation. Moreover, the operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure.

What is claimed is:

1. A method for delivering content for display on client devices, comprising operations of:
    receiving, at one or more servers, content that includes a plurality of user generated content (UGC) items, at least a portion of which is abusive;
    processing, at the one or more servers, the plurality of UGC items using a predictive model to obtain a predictive probability of whether each of the plurality of UGC items is abusive or not abusive;
    selecting, based on the predictive probability, specific ones of the plurality of UGC items for which to request a label;
    updating, in response to receipt of one or more labels, the predictive model using the one or more labels;
    applying the predictive model having been updated to the plurality of UGC items for removing the portion of the plurality of UGC items that is abusive from the content; and
    serving, to a client device, the content without the portion of the plurality of UGC items that is abusive, wherein the selecting further includes creating a probabilistic queue for delivering the plurality of UGC items to a human labeler, and wherein an order of the probabilistic queue is dependent on the predictive probability.

2. The method of claim 1, wherein UGC items that are associated with a predictive probability of being abusive have a placement within the probabilistic queue that is ahead of UGC items that are associated with a predictive probability of being not abusive.

3. The method of claim 1, wherein the processing the plurality of UGC items is further configured to obtain an importance weight for each of the plurality of UGC items, and wherein the updating the predictive model includes adjusting the importance weight using the one or more labels.

4. The method of claim 1, wherein said selecting specific ones of the plurality of UGC items for which to request the label is further based on an instrumental distribution.

5. The method of claim 1, wherein the plurality of UGC items include text, wherein the text is processed as an elemental representation.

6. The method of claim 1, wherein the plurality of UGC items include an image, wherein the image is processed using a bag of features model.

7. The method of claim 1, wherein the portion of the plurality of UGC items that is abusive includes one or more of spam, fraudulent offers, illegal offers, offensive language, threatening language, and treasonous language.

8. The method of claim 1, wherein the predictive model includes a memory loss factor, the memory loss factor enables the predictive model to adapt to concept drift of UGC items.

9. A computer-implemented method, comprising operations of:
  receiving, at one or more servers, a plurality of user generated content (UGC) items that has been posted to an online stream at a website, at least of portion of which is abusive;
  processing, at the one or more servers, the plurality of UGC items using a predictive model to obtain a predictive probability of whether each of the plurality of UGC items is abusive or not abusive, wherein the predictive probability is used for selecting specific ones of the plurality of UGC items associated with a label and the predictive model is updated using one or more labels when received, wherein said processing removes the portion of the plurality of UGC items based on the predictive probability; and
  delivering, to a client device when the client device accesses the website, the plurality of UGC items without the portion of the plurality of UGC items that is abusive, wherein said selecting further includes creating a queue for delivering selected ones of the plurality of UGC items to a human labeler that generates the label and other labels responsive to label requests, and an order of the queue depends upon the predictive probability;
  wherein the specific ones of the plurality of UGC items become associated with the label once the label is generated.

10. The computer-implemented method of claim 9, wherein UGC items having the predictive probability of being abusive are placed ahead of UGC items having the predictive probability of being not abusive within the queue.

11. The computer-implemented method of claim 9, wherein the processing the plurality of UGC items is further configured to obtain an importance weight for each of the plurality of UGC items, and wherein the predictive model is additionally updated by adjusting the importance weight using the one or more labels.

12. The computer-implemented method of claim 9, wherein said selecting specific ones of the plurality of UGC items associated with a label is further based on an instrumental distribution.

13. The computer-implemented method of claim 9, wherein at least a portion of the plurality of UGC items includes text, wherein the text is processed as elemental representations.

14. The computer-implemented method of claim 9, wherein at least a portion of the plurality of UGC items includes an image, wherein the image is processed using a bag of features model.

15. The computer-implemented method of claim 9, wherein the portion of the plurality of UGC items that is abusive includes one or more of spam, fraudulent offers, illegal offers, offensive language, threatening language, and treasonous language.

16. The computer-implemented method of claim 9, wherein the predictive model includes a memory loss factor that enables the predictive model to adapt to concept drift of UGC items.

17. A non-transitory computer-readable medium storing a computer program executable by a processor-based system, comprising:
  program instructions for receiving, at one or more servers, a plurality of user generated content (UGC) items that has been posted to an online stream at a website, at least of portion of which is abusive;
  program instructions for processing, at the one or more servers, the plurality of UGC items using a predictive model to obtain a predictive probability of whether each of the plurality of UGC items is abusive or not abusive, wherein the predictive probability is used for selecting specific ones of the plurality of UGC items associated with a label and the predictive model is updated using one or more labels when received, wherein said processing removes the portion of the plurality of UGC items based on the predictive probability; and
  program instructions for delivering, to a client device when the client device accesses the website, the plurality of UGC items without the portion of the plurality of UGC items that is abusive, wherein said selecting further includes creating a queue for delivering selected ones of the plurality of UGC items to a human labeler that generates the label and other labels responsive to label requests, and an order of the queue depends from the predictive probability such that UGC items having the predictive probability of being abusive are placed ahead of UGC items having the predictive probability of being not abusive within the queue and the specific ones of the plurality of UGC items become associated with the label once the label is generated.

* * * * *